US007533914B2

(12) United States Patent
Rosert et al.

(10) Patent No.: US 7,533,914 B2
(45) Date of Patent: May 19, 2009

(54) CARRYING SYSTEM FOR A RESPIRATOR PRODUCT

(75) Inventors: Michael Rosert, Lübeck (DE); Arnd Kausch, Bad Schwartau (DE); Dirk Feil, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 420 days.

(21) Appl. No.: 11/278,723

(22) Filed: Apr. 5, 2006

(65) Prior Publication Data

US 2006/0261615 A1 Nov. 23, 2006

(30) Foreign Application Priority Data

May 20, 2005 (DE) ....................... 10 2005 023 372

(51) Int. Cl.
*B65G 7/12* (2006.01)
*B63C 11/18* (2006.01)

(52) U.S. Cl. .......................... 294/15; 294/167; 405/186

(58) Field of Classification Search ................... 294/15, 294/27.1, 162, 163, 167; 405/186, 187; 114/315; 211/85.18
See application file for complete search history.

(56) References Cited

U.S. PATENT DOCUMENTS 2,404,513 A * 7/1946 McCabe .................. 211/85.18
3,483,865 A * 12/1969 Arnell et al. ........... 128/205.22
3,495,413 A * 2/1970 Pinto .......................... 405/186
3,756,450 A * 9/1973 Crose, Jr. .................... 220/724
3,842,611 A * 10/1974 Anderson ................... 405/186
4,168,025 A * 9/1979 Bantner ...................... 294/159
4,455,718 A 6/1984 Finnern
5,199,820 A 4/1993 Nicklo
5,271,387 A * 12/1993 Murray .................. 128/200.24
5,913,467 A * 6/1999 Berg .......................... 224/628
5,957,079 A 9/1999 Wessels
6,227,198 B1 5/2001 Wiegand et al.
6,536,820 B1 * 3/2003 Dean et al. .................. 294/159

FOREIGN PATENT DOCUMENTS

DE 387371 1/1924
DE 3417823 3/1985
DE 8810343.9 11/1988
DE 19816300 C1 8/1999

* cited by examiner

*Primary Examiner*—Dean J Kramer
(74) *Attorney, Agent, or Firm*—McGlew and Tuttle, P.C.

(57) ABSTRACT

A carrying system for a respirator product shall be improved such that it shall have a simple design, make it possible to protect the cylinder valves and receive additional weights in a simple manner. To accomplish the object, a bracket (1) is provided, which has a U-shaped protective strap (4) in the area of the cylinder valves (28) and has a mount (15, 16, 24, 25) for a balance weight (5), which can be pushed in between the pressurized gas cylinders (18).

17 Claims, 3 Drawing Sheets

CARRYING SYSTEM FOR A RESPIRATOR PRODUCT

CROSS REFERENCE TO RELATED APPLICATIONS

This application claims the benefit of priority under 35 U.S.C. § 119 of German Patent Application 10 2005 023 372.4 filed May 20, 2005, the entire contents of which are incorporated herein by reference.

FIELD OF THE INVENTION

The present invention pertains to a carrying system for a respirator product.

BACKGROUND OF THE INVENTION

A carrying system for an underwater breathing gas circulating system has become known from DE 198 16 300 C1 (corresponding to U.S. Pat. No. 6,227,198). Various breathing gas-carrying components and a pressurized gas cylinder as a breathing gas reservoir are arranged on a carrying vest, which is fastened at the shoulders and the hip of a user of the device. To stabilize the diver's position in the water, pockets, into which taring weights can be pushed, are provided in the outer shell of the carrying vest. In addition, the carrying vest contains a taring bladder, with which the buoyancy can be adapted.

Devices that are used for respiration above water or under water must be robust and able to be operated in a simple manner. If pressurized gas cylinders made of fiber composites, as they appear as an example from DE 88 10 343 U1, are to be used in a diving apparatus for weight reasons, a special protection of the cylinder valves against damage must be present. Because of the lower weight of the cylinder, a greater range of variations is necessary for taring.

DE 34 17 823 A1 discloses a carrying device for compressed air respirators with a vertical bracket, which has a carrying handle at the upper end and a foot support at the lower end. Damage to the cylinder valves when the compressed air respirator is put down is to be prevented with the foot support.

DE 387 371 B discloses a carrying device for pressurized gas cylinders of a diving apparatus. A crossbolt is located between the pressurized gas cylinders for receiving two jettisoning weights. The jettisoning weights can be separated from the crossbolt by means of a coupling when needed.

U.S. Pat. No. 5,199,820 discloses a weight cylinder for divers, which is fastened either directly to the back plate of a carrying device for a pressurized gas cylinder or to the pressurized gas cylinder itself by means of a holding strap.

U.S. Pat. No. 4,455,718 discloses a weight strap for a diving apparatus, which is laid directly around the pressurized gas cylinder in the circumferential direction. A similar arrangement appears from U.S. Pat. No. 5,957,079, where the weight strap is provided with separate additional weights.

SUMMARY OF THE INVENTION

The basic object of the present invention is to provide a carrying system for a respirator product, which has a simple design and can receive additional weights in a simple manner.

According to the invention, a carrying system is provided for a respirator product. The carrying system includes a bracket for two pressurized gas cylinders and a mount between the pressurized gas cylinders for a balance weight. The balance weight can be pushed in along the pressurized gas cylinders.

The advantage of the present invention is essentially that the mount is provided at the bracket extending between the two pressurized gas cylinders for an elongated balance weight, with which the weight of the carrying system can be adapted when this carrying system is used in the area of diving. The free space between the pressurized gas cylinders is advantageously used here for attaching the balance weight. Thus, good space utilization is achieved, on the one hand, and, due to the fact that the entire length of the pressurized gas cylinders can be utilized to receive the balance weight, it is possible to vary the weight of the balance weight over a broad range. Furthermore, excellent taring, i.e., trimming, is achieved due to placement very close to the body. The balance weight has a grip, with which it can be pushed into the mount at the carrying system in a simple manner. To change the weight of the balance weight, balance weights with different lengths are made available. The user can directly estimate the weight from the length of the balance weight without having to read the labelings. The desired balance weight is taken from a magazine and pushed into the mount at the carrying system.

The bracket expediently has at its lower end a protective strap, which extends around the cylinder valves of the pressurized gas cylinders in a U-shaped pattern and thus protects these from damage. The other end of the bracket is designed as a carrying handle, with which the pressurized gas cylinders can be transported.

As an alternative, the protective strap may also be designed as a support foot on which the carrying system is put down.

The protective strap is advantageously provided on the underside of the carrying system with a flattened area, which is used as a base for the carrying system.

The carrying system is designed such that a mounting shell extending around the pressurized gas cylinders is provided on the side facing the user of the device. On the opposite side of the mounting shell, a cover plate, which protects the pressurized gas cylinders from mechanical damage, is located above the pressurized gas cylinders.

In addition, the free space between the mounting shell and the cover plate may also be used to receive pneumatic or electric components of the respirator product. A locking device, into which the balance weight snaps, is provided to reliably fasten the balance weight within the carrying system.

An exemplary embodiment of the present invention is shown in the drawings and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
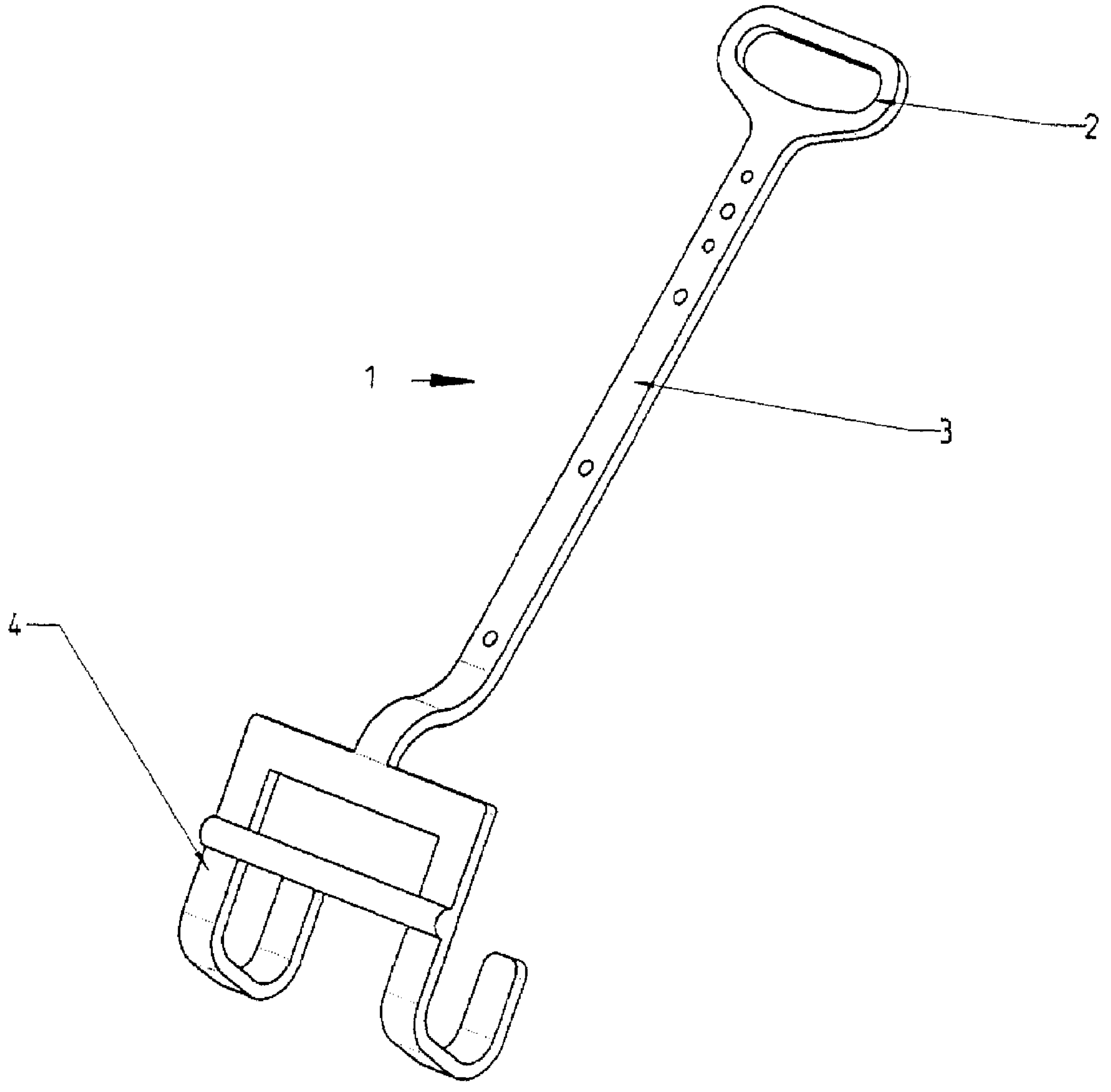
FIG. 1 is a perspective view of a bracket according to the invention.

Referring to the drawings in particular, FIG. 1 shows a perspective view of a bracket 1 of a carrying system, which is not shown in greater detail in FIG. 1 and comprises a carrying handle 2 on the top side, a middle part 3 and a protective strap 4 bent in a U-shaped manner on the underside.

Figure 2:
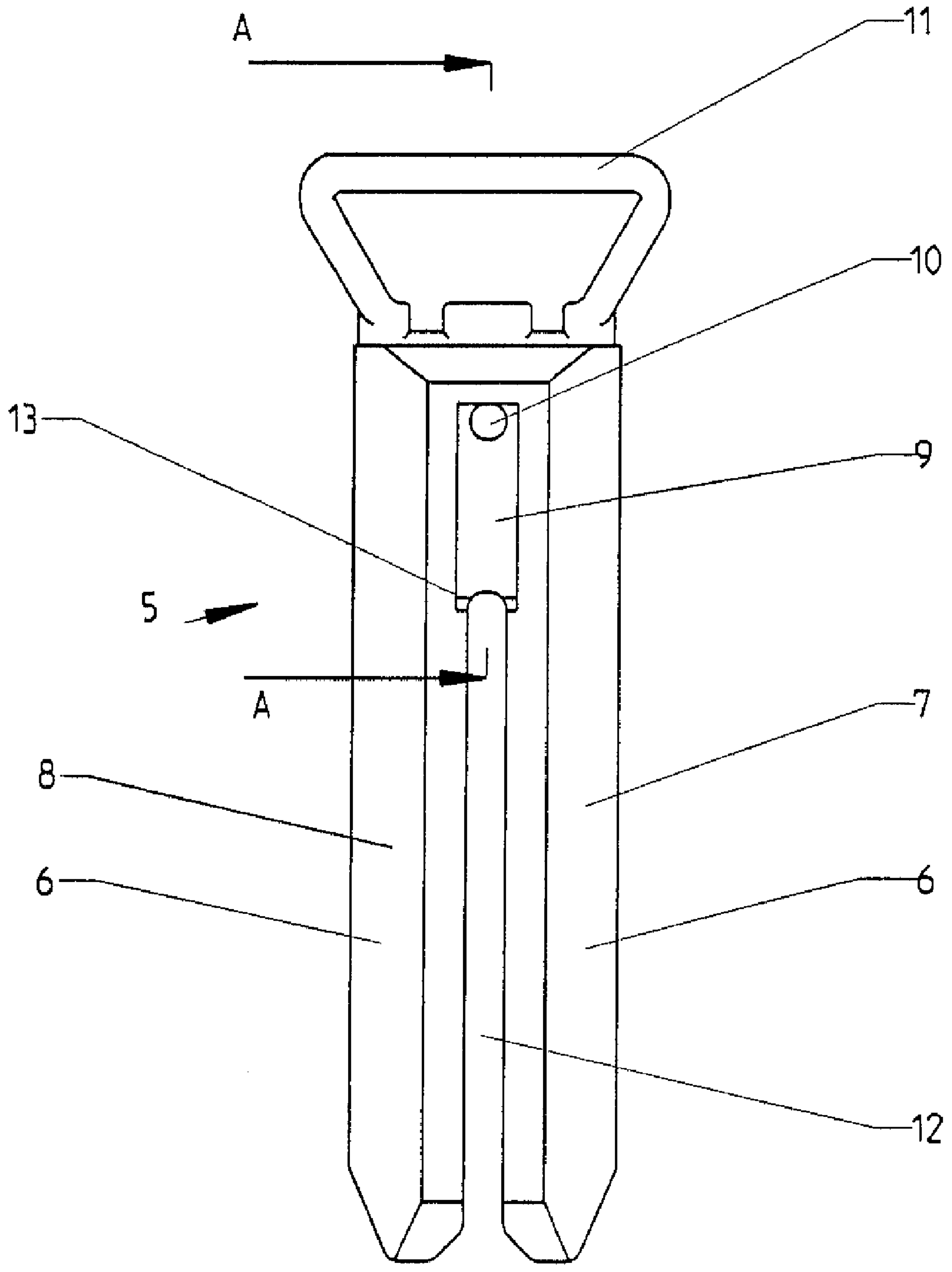
FIG. 2 is a perspective view of a balance weight according to the invention.

FIG. 2 illustrates a balance weight 5, which consists of a material 6 of high density with two legs 7, 8 and a sliding surface 9 with a hole 10 and with a grip 11. A gap 12 is located between the legs 7, 8. The sliding surface 9 is designed as an oblique plane, which extends beginning from an underside 13 rising towards the hole 10.

Figure 3:
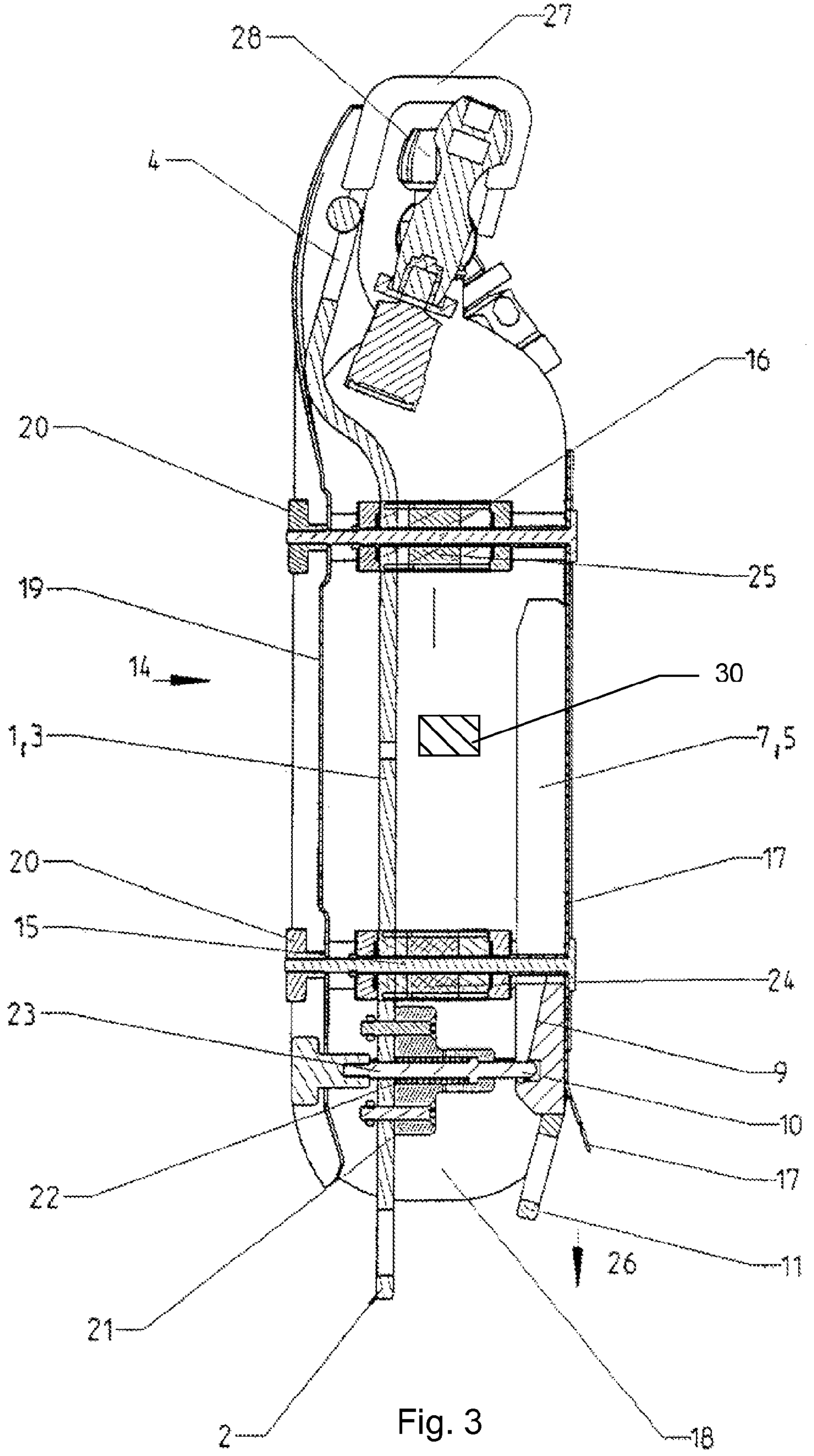
FIG. 3 is a longitudinal sectional view of a carrying system according to the invention.

FIG. 3 shows the longitudinal section of a carrying frame 14 according to the present invention. Identical components are designated by the same reference numbers as in FIGS. 1 and 2.

Two bolts (connection elements) 15, 16 connected with the bracket 1 connect a mounting shell 17 with a cover plate 19. The mounting shell 17 is in contact with the back of a user of the device (the user is not shown in FIG. 3) and is for two pressurized gas cylinders 18 made of a fiber composite. The cover plate 19 covers both pressurized gas cylinders 18. Only the rear one of the two pressurized gas cylinders 18, located next to one another, can be recognized in the longitudinal section shown in FIG. 3. The cover plate 19 is fastened to the bolts 15, 16 by means of two knurled nuts 20.

A stop bolt 23, which is received in a housing 21 and is pretensioned with a spring 22, is located with its front side in the hole 10. Two bearing blocks 24, 25 support the legs 7, 8 of the balance weight 5 against the middle part 3 of the bracket 1.

The balance weight 5 as shown in FIG. 3 is shown in section taken along the section line A-A of FIG. 2. As such, only the rear leg 7 can be recognized in FIG. 3. The bolts 15, 16 extend within the slot 12, FIG. 2.

To remove the balance weight 5, the stop bolt 23 is pulled out of the hole 10 of the balance weight 5 and the balance weight 5 is pulled out upward in the direction of arrow 26. The legs 7, 8 are now passed through the bearing blocks 24, 25 and the mounting shell 17 on the opposite side.

When the balance weight 5 is inserted, centering is performed via the bolts 15, 16 in the gap 12. When the balance weight 5 has been pushed in nearly completely, the stop bolt 23 reaches the sliding surface 9 until it finally snaps into the hole 10. The balance weight is fixed within the carrying frame 14 by means of the bolt 23 and the hole 10.

The underside of the protective strap 4 has a flattened area 27, which acts as a base for the carrying frame 14 and extends around the cylinder valves 28. The space between the cover plate 19 and the mounting shell 17 can be additionally used to accommodate electronic and pneumatic components 30.

While a specific embodiment of the invention has been shown and described in detail to illustrate the application of the principles of the invention, it will be understood that the invention may be embodied otherwise without departing from such principles.

What is claimed is:

1. A carrying system for a respirator product, the carrying system comprising:

two pressurized gas cylinders;

a pressurized gas cylinders bracket connected to said pressurized gas cylinders, said bracket having a carrying handle on a top side thereof;

a balance weight; and a mount between the pressurized gas cylinders for said balance weight, said mount having a shape so said balance weight can be pushed into a seated position in said mount from a side of said carrying handle by moving along said pressurized gas cylinders.

2. A carrying system in accordance with claim 1, further comprising a protective strap for protecting cylinder valves of said pressurized gas cylinders, said protective strap being arranged on an underside of said bracket.

3. A carrying system in accordance with claim 2, wherein said protective strap is provided on an underside with a flattened area as a base for said carrying system.

4. A carrying system in accordance with claim 1, wherein said balance weight has a grip at the level of said carrying handle of said bracket.

5. A carrying system in accordance with claim 1, further comprising a locking device wherein said balance weight is fastened in said mount by means of said locking device.

6. A respirator system comprising:

two pressurized gas cylinders with a valve arrangement for supplying breathing air to a user;

a mounting shell extending around said pressurized gas cylinders, said mounting shell being provided on a side facing the user of the device;

a cover plate for covering said pressurized gas cylinders, said cover plate being provided opposite said mounting shell;

a gas cylinders bracket connected to said pressurized gas cylinders and to said mounting shell cover plate; and a weight mount disposed in a mounting space defined by said gas cylinders and one of said mounting shell and said cover plate, said weight mount having a shape with shaped surfaces for assuming a seated position with said shaped surfaces in contact with and/or adjacent to said pressurized gas cylinders.

7. A respirator system in accordance with claim 6, wherein:

said bracket has a carrying handle on a side of the system; and said weight mount can be pushed into said mounting space from a side of said carrying handle.

8. A respirator system in accordance with claim 7, wherein said weight mount has a grip at the level of said carrying handle of said bracket.

9. A respirator system in accordance with claim 6, further comprising a protective strap for protecting cylinder valves of said pressurized gas cylinders, said protective strap being arranged on an underside of said bracket.

10. A respirator system in accordance with claim 6, wherein said bracket has an integrally formed protective strap for protecting cylinder valves of said valve arrangement, said protective strap being arranged an end of said bracket.

11. A respirator system in accordance with claim 6, further comprising:

connection elements, wherein said bracket, said mounting shell and said cover plate connect together via said connection elements.

12. A respirator system in accordance with claim 11, wherein said bracket has an integrally formed protective strap for protecting cylinder valves of said valve arrangement, said protective strap being arranged an end of said bracket.

13. A respirator system in accordance with claim 12, further comprising pneumatic and/or electric components of a respirator product accommodated between said mounting shell and said cover plate.

14. A respirator system in accordance with claim 11, further comprising a locking device wherein said weight mount is fastened in said mounting space by means of said locking device.

15. A carrying system for a respirator product, the carrying system comprising:

two pressurized gas cylinders;

a pressurized gas cylinders bracket connected to said pressurized gas cylinders, said bracket having a carrying handle on a top side thereof;

a balance weight;

a mount between the pressurized gas cylinders for said balance weight, said mount having a shape so the balance weight can be pushed into a seated position in said mount from a side of said carrying handle by moving along said pressurized gas cylinders; and a mounting shell extending around said pressurized gas cylinders, said mounting shell being provided on a side facing a user of the pressurized gas cylinders.

16. A carrying system in accordance with claim 15, further comprising a cover plate for covering said pressurized gas cylinders, said cover plate being provided opposite said mounting shell.

17. A carrying system in accordance with claim 16, further comprising pneumatic and/or electric components of the respirator product accommodated between said mounting shell and said cover plate.

* * * * *